United States Patent
Corbin

[15] 3,692,324
[45] Sept. 19, 1972

[54] AUTOMOBILE SUSPENSION

[72] Inventor: Paul Corbin, 7737 St. Denis St., Montreal, Quebec, Canada

[22] Filed: Jan. 29, 1971

[21] Appl. No.: 110,815

[52] U.S. Cl. ............280/96.2 R, 280/112 A, 280/124
[51] Int. Cl. .....................................................B60p 1/00
[58] Field of Search ......................280/112 A, 96.2 R

[56] References Cited

UNITED STATES PATENTS

| | | | |
|---|---|---|---|
| 3,261,621 | 7/1966 | Corbin | 280/96.2 R |
| 3,408,088 | 10/1968 | Corbin | 280/96.2 R |
| 3,604,724 | 9/1971 | Corbin | 280/96.2 R |

*Primary Examiner*—Gerald M. Forlenza
*Assistant Examiner*—Frank E. Werner
*Attorney*—Raymond A. Robic

[57] ABSTRACT

A suspension for a motor vehicle, namely an automobile, having a body and a pair of upstanding steering knuckles on either side of the body with a wheel mounted for steering on each knuckle intermediate its ends. A pair of suspension members extends transversely of the body in the direction of one another, each member being pivoted at one end to the top of the steering knuckles and pivoted at the other end to the body, above its center of gravity. A rigid axle bar is articulated at its ends to the lower ends of the knuckles to keep them apart a predetermined distance so that swaying of the body as in a curve may cause banking of the knuckles and wheels toward the center of the curve. A lateral stabilization yoke formed of a pair of side legs and a bight has the ends of its legs connected to the axle bar. A pair of spring units are each connected at one end to the suspension members or to the yoke and to the body so as to transfer the weight of the body to the steering knuckles. A sway motion compensating lever is mounted for rotation about an axis extending through the center thereof and is connected, by means of levers, to the bight of the yoke and to the body, these levers being so arranged that swaying motion of the body relative to the bight causes rotation of the compensating lever about its axis whereby to allow the swaying motion of the body.

10 Claims, 7 Drawing Figures

INVENTOR
Paul CORBIN
BY
ATTORNEY

INVENTOR
Paul CORBIN
BY

ATTORNEY

AUTOMOBILE SUSPENSION

The present invention relates generally to suspensions for motor vehicles, particularly automobiles, and may be considered as an improvement of the suspensions described in my U.S. Pat. Nos. 3,261,621 and 3,408,088.

As with the suspension described in the aforesaid application, the general object of the present invention lies in a novel construction that will allow suspension of the body of the vehicle above its center of gravity and its rocking, in a curve, away from the center of the curve as well as banking of the wheels toward the center of the curve. The present invention differs from the construction in the aforesaid application by the incorporation of a compensating mechanism intended to prevent jolting of the body when the wheels hit an obstacle or hole on the road by neutralizing the side movement of the body that would otherwise be caused by the sudden rise or drop of the wheels. The same compensating mechanism or structure also allows automatic banking of the wheels in curves. Accordingly, this invention generally comprises a yoke supported by the steering knuckles and connected to the vehicle body through a compensating lever mechanism adapted to allow swaying motion of the vehicle body.

The yoke and compensating lever mechanism, used in conjunction with a novel suspension frame, leave the forward end of the vehicle free for the mounting of a motor.

Also according to the invention, a similar compensation lever mechanism is used in a rear suspension to control and limit the sway-motion of the rear end of the vehicle.

More specifically, the invention is for use in a motor vehicle having a body and a pair of upstanding steering knuckles on either side of the body with a wheel mounted for steering on each knuckle intermediate its ends. The combination of the invention comprises a pair of suspension members extending transversely of the body and generally directed toward one another, each suspension member being pivoted at one end to the top of one steering knuckle and pivoted at the other end to the body above its center of gravity. A rigid axle is articulated at its ends to the lower ends of the steering knuckles to keep them apart a predetermined distance so that swaying of the body as in a curve may cause banking of the knuckles and wheels toward the center of the curve. A lateral stabilization yoke formed of a pair of side legs and a bight has the ends of its legs connected to the axle. A pair of spring units are each connected at one end to the suspension members or to the yoke and to the body so as to transfer the weight of the body to the steering knuckles. A sway-motion compensating lever is mounted for rotation about an axis that extends through its center and is connected to the bight of the yoke and to the body by a lever assembly so arranged that swaying motion of the body relative to the bight causes rotation of the compensating lever about its axis whereby to allow swaying motion of the body.

In a preferred embodiment of the invention, the lever assembly interconnecting the compensating lever, the bight of the yoke member and the body comprises: a pair of upstanding idlers on either side of the body each mounted at the lower end on the body for pivotal movement about an axis extending longitudinally of the body; a transverse motion-transferring bar articulated at the center to the bight of the yoke and, at the ends, to the idlers; two links pivotally connected to the vehicle body on either side thereof, one of the links being articulated to one end of the compensating lever while a connecting rod is articulated to the other end of the compensating lever and to the other link.

In this further embodiment, the legs of the yoke member are solid with the axle bar while the bight is articulated at the ends thereof to the top ends of the legs.

According to a further embodiment of the invention, the body includes an upstanding frame at the forward end and the steering knuckles, the axle and the suspension members are generally disposed along the four sides of a quadrilateral thus forming a suspension frame for the body. The lever assembly joining the compensating lever to the body is formed of a pair of trailing arms articulated to the top of the forward frame and to the top of the suspension frame, respectively, while articulated connections join the trailing arms and the free ends of the compensating lever, the latter being mounted on the bight of the yoke for rotation about an axis through its center. Each articulated connection comprises a link rigid with and laterally projecting from the corresponding trailing arm adjacent the upstanding forward frame and a connecting rod articulated to the free end of the link and to one free end of the rotary compensating lever, respectively.

The invention will be better understood by the description that follows of preferred embodiments thereof having reference to the appended drawings wherein.

In this specification and in the claims, the term "articulation" should be understood to apply to a connection between two members that allows limited universal relative movement such as by means of a ball joint.

Figure 1:
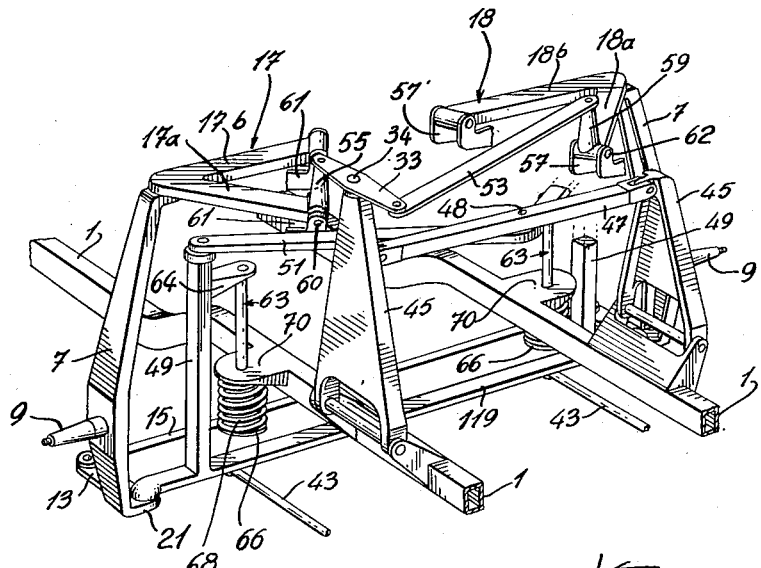
FIG. 1 is a perspective view of a first embodiment of a front suspension according to the invention.
Figure 2:
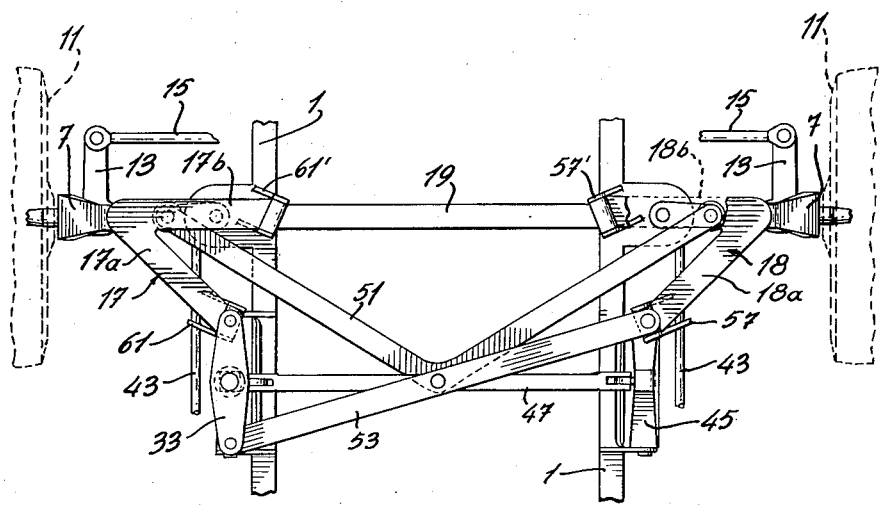
FIG. 2 is a plan view of the front suspension of FIG. 1.

Referring now to FIGS. 1 and 2, illustrating a front wheel suspension according to the first embodiment, there is shown an automobile body which, for the sake of clarity, is represented only by the perimeter body frame 1. The body 1 is supported by a pair of upstanding steering knuckles 7 provided with the usual stub shafts 9, intermediate their ends, for the mounting of the front steering wheels 11. The knuckles 7 are steering by steering arms 13 solid therewith and actuated by a steering mechanism (not shown) of conventional construction represented here simply by a transverse rod 15.

A pair of suspension members 17, 18 extend transversely of the body 1 and are directed substantially toward one another. The members 17, 18 are V-shaped and are formed with legs 17a, 17b and 18a, 18b respectively.

The legs 17a, 18a are rigidly connected to upstanding links 55 and 59 defining therewith L-shaped pieces pivoted at 60, 62 to the body frame represented by brackets 61, 57. The legs 17b, 18b are directly pivoted to the body frame represented by brackets 57'–61'. Members 17, 18 are articulated at the apices thereof to the top of the steering knuckles 7.

A rigid axle 19 is articulated at its ends to the feet 21 at the lower ends of the knuckles 7, the axle 19 serving to hold the knuckles 7 and the wheels 11 at a set predetermined distance. Obviously, the feet 21 should be at as a low level as feasible.

Lateral stabilization of the vehicle body is obtained by means of a yoke formed of a pair of legs 49 solid with the straight axle 19 and a bight 51 articulated at the ends to the top of the legs 49.

The compensating mechanism comprises a compensating lever 33, mounted for rotation about a vertical axis through its center, and a leverage means connecting the compensating lever 33 to the bight 51 of the yoke and to the body 1.

This leverage means comprises a pair of upstanding generally triangular idlers 45, one on either side of the vehicle body. Each idler is mounted by its base on the vehicle body for pivotal movement about an axis extending longitudinally of the body. A transverse motion-tranferring rod or bar 47 is articulated at its center 48 to the bight 51 of the yoke and pivoted at the ends to the idlers 45, respectively. The aforementioned rotary compensating lever 33 is mounted at the top of one of the triangular idlers 45, slightly above the bar 47.

The leverage means further comprises a connecting rod 53 articulated at one end to the compensating lever 33 and at the other end to the top of the link 59. The compensating lever 33 is articulated at the other end to the top of the other link 55.

Resilient load-transferring units 63 are connected to the legs 49 of the yoke, through supports 64. Each is formed of a rod pivoted at one end to one of the said supports 64 and at the other end to a show 66; the rods extending freely across the perimeter frame 1 and compression springs 68 being held captive between the said shoes 66 and further shoes 70.

The above described suspension operates as follows, reference being had particularly to FIG. 1.

If the right wheel rises, the V-shaped element 51 of the yoke shifts the bar 47 leftward causing the idlers 45 to rotate slightly counterclockwise, that is further left. Since the leftward side is hardly affected by the jolt, the suspension member 17 and its link 55 remain stationary forcing clockwise rotation of the compensating lever 33.

Rising of the right wheel causes lifting of the rightward knuckle 7 and upward tilting of the rightward suspension member 18. Consequently, the link 59, solid with the leg 18a causes leftward shifting of the connecting rod 53 and consequently the latter will merely follow the previously mentioned clockwise rotation of the compensating lever 33.

Thus, the jolt on the right wheel will be completely absorbed by the compensating mechanism in the manner aforedescribed.

If both right and left wheels rise simultaneously are equal amount, both steering knuckles 7 will rise tilting link 55 clockwise and link 59 counterclockwise, thus causing clockwise rotation of the compensating lever 33 and absorption of the jolt without the vehicle body being affected.

Figure 3:
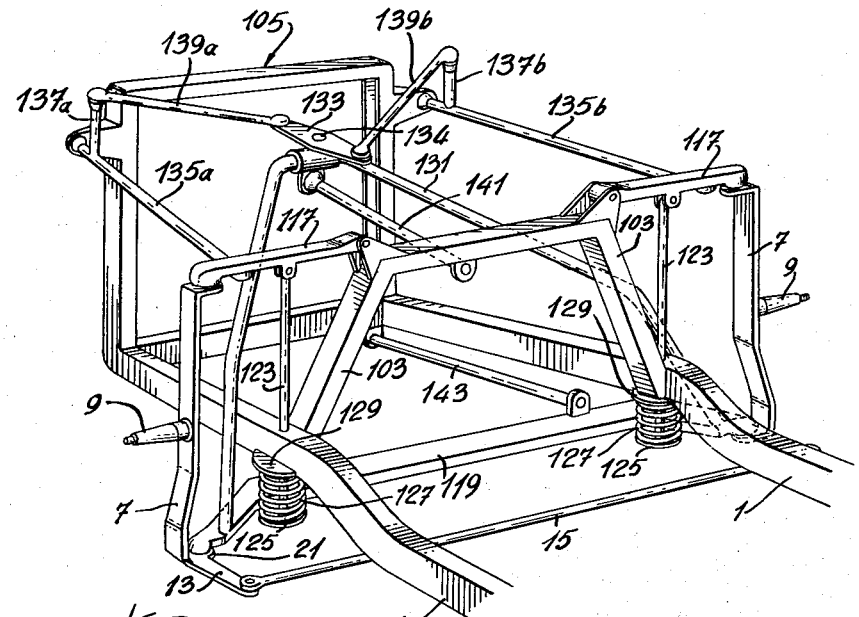
FIG. 3 is a perspective view of the suspension of the invention according to a second embodiment.
Figure 4:
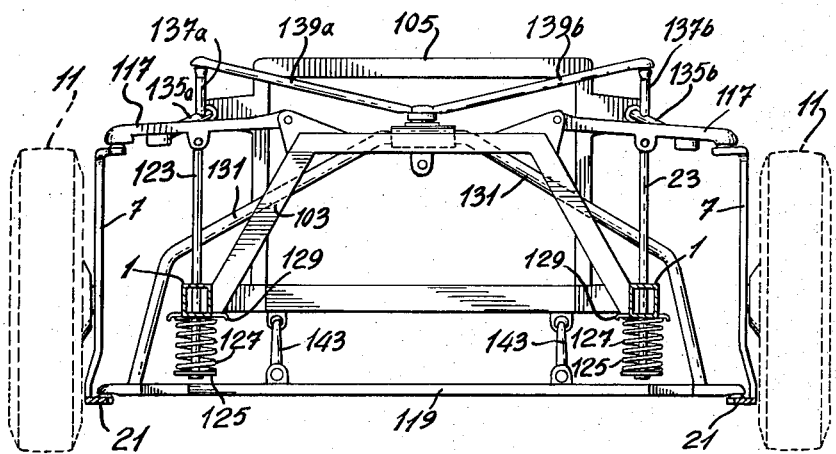
FIG. 4 is an end elevation view, looking forwardly, of the embodiment of FIG. 3, the vehicle travelling on a straight road.
Figure 5:
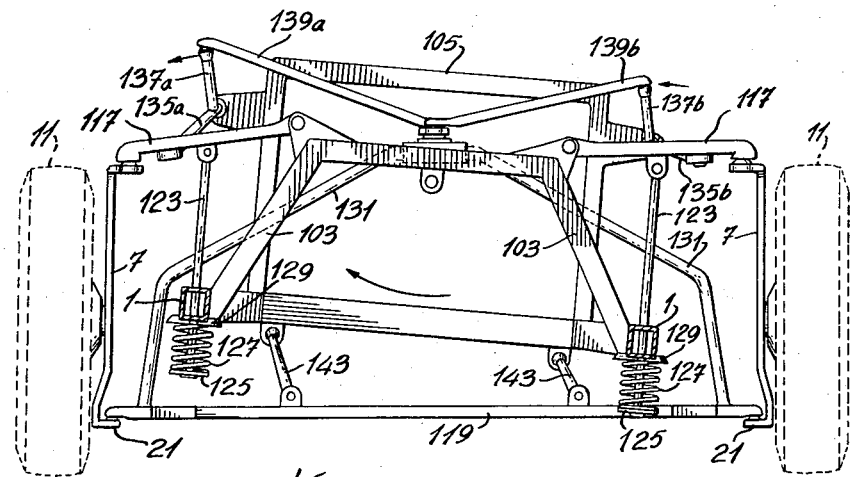
FIG. 5 is a side elevation view similar to that of FIG. 4 illustrating the vehicle taking on a curve.
Figure 7:
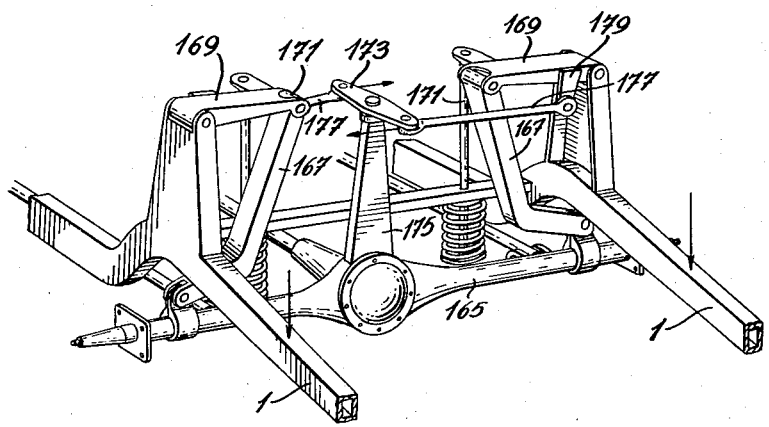
FIG. 7 is a perspective view of a rear suspension.

In the embodiment illustrated in FIGS. 3, 4 and 5, the marking difference lies in that the rotary compensating lever 33 lies centrally of the vehicle body rather than on one side thereof as in the aforedescribed embodiment.

In this embodiment, the body frame 1 has a first upstanding frame 103 and a further upstanding frame 105 at the forward end of the perimeter frame 1. Frame 103 is, in general, transversely in alignment with the upstanding knuckles 7.

The suspension members 117 extend, as in the previous example, transversely of the body 1 and are substantially directed toward one another. Each is mounted at one end to the top of a knuckle 7 for pivotal movement about a vertical axis and mounted at the other end to the top of the upstanding frame 103 for pivotal movement about a horizontal axis, the body frame being suspended about its center of gravity as in the first embodiment.

Figure 6:
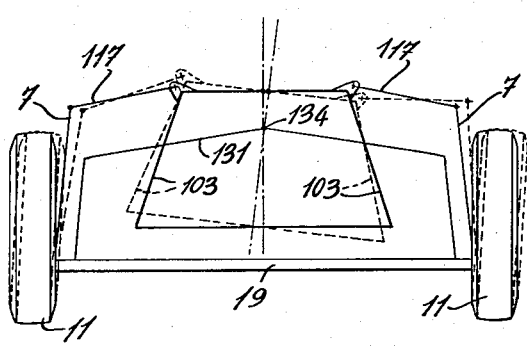
FIG. 6 is a diagram to illustrate the working of the wheel banking mechanism.

Inspection of FIGS. 3, 4 and 5 will show that this construction of the steering knuckles 7, the axle 19 and the suspension members 117 (that can be assimilated to the four sides of a deformable quadrilateral having one open side 117), forming the suspension frame, on the one hand, and the body frame represented by the upstanding frame 103 on the other hand, allows banking of the steering knuckles 7 and wheels 11, in a curve, toward the center of the curve subsequent to swaying of the vehicle body supported above its center of gravity. Such a result is more clearly illustrated in the diagram of FIG. 6.

In this second embodiment, the weight of the vehicle body is transferred to the steering knuckles 7 and wheels 11 by means of a pair of resilient units each formed of a rod 123 pivoted at one end to a suspension number 117 and at the other end to a shoe 125; the rods 123 extending freely across the perimeter frame 1 and compression springs 127 being held captive between shoes 125 and further shoes 129 of the frame 1.

A yoke 131 is provided for the lateral stabilization of the vehicle body, this yoke being formed of a pair of side legs merging into a central bight, the ends of the legs being secured to the axle 119.

The compensating mechanism comprises a compensating lever 133 mounted on the bight of the yoke 131 for rotation about an axis extending at 134 through its center; a leverage means connecting the rotary lever 133 to the bight of the yoke 131 and to the body 1 as in the previous embodiment. This leverage means is formed of a pair of trailing arms 135a, 135b articulated at one end to the top of the upstanding frame 105 on either side thereof and mounted at the other end to the top of the suspension frame aforesaid, more specifically to the suspension members 117, being mounted thereto for pivotal action about vertical axes. Articulated connections join the trailing arms 135a, 135b and the free ends of the rotary lever 133. These articulated connections are formed of links 137a, 137b rigid with and laterally projecting from the trailing arms 135a, 135b adjacent the upstanding frame 5 and connecting rods 139a, 139b articulated at one end to the free end of the links 137a, 137b and articulated at the other end to one free end of the rotary compensating lever 133.

A retaining arm 141 articulated at the ends to the bight of yoke 131 and to the frame 103, respectively, holds the said yoke 131 into proper upright position.

The operation of the vehicle suspension according to this embodiment operates as follows.

Assuming the right wheel to rise, as when passing over an obstacle on the road, the center pivot 134 of the yoke 131 is shifted leftward and, since the leftward side of the vehicle is hardly affected by the rise, the connectingrod 139a remains substantially stationary, causing compensating lever 133 to rotate clockwise. Rising of the right wheel will of course lift the corresponding steering knuckle 7 thus lifting the rightward suspension member 17 and trailing arm 135b. These two members 117, 135b act together like the two sides of a triangle in the same manner as the V-shaped members 17, 18 of FIG. 1 so that the trailing arm 135b rotates slightly causing the link 137b to rotate counterclockwise. Thus, the connecting rod 137b follows the aforesaid clockwise rotation of the compensating lever 133 and the jolt on the right wheel is absorbed or neutralized by the compensating mechanism and the body represented by the frames 1, 103 and 105 is unaffected.

If both right and left wheels rise simultaneously an equal amount, the trailing arm 135a and 135b force their links 137a, 137b to rotate respectively clockwise and counterclockwise, forcing clockwise rotation of the compensating lever 133 and absorption of the jolts without the vehicle body being affected.

A similar compensating mechanism is applied, according to the instant invention, to the rear suspension shown in FIG. 5 wherein the body 1 is supported on the rear axle 165 by means of a pair of support inclined struts 167 pivoted at the lower ends to the axle 165 and at the upper ends, about the center of gravity of the vehicle body, to the suspension members 169, the other ends of which are pivoted to the vehicle body. Shock absorbing spring units 171 connected at one end to the members 169 and at the other end to the vehicle body, transfer the weight of the latter to the axle 165. In this embodiment, the sway motion compensating lever 173 is mounted on the top of a post 175, provided centrally of axle 165, for rotation about an axis extending through its center; a pair of connecting rods 175 articulated to the free ends of the lever 173 and to the suspension members 169, respectively, through downward brackets 179, causes rotation of the lever 173 subsequent to swaying of the body to compensate for this movement, in the same manner as in the above-described embodiment.

I claim:

1. In a motor vehicle having a body and a pair of upstanding steering knuckles on either side of said body with a wheel mounted on each steering knuckle intermediate its ends to be steered thereby, the combination therewith comprising:

a. a pair of suspension members extending transversely of said body substantially in the direction of one another, each suspension member being articulated at one end to the top of one of said steering knuckles and pivoted at the other end to said body, above the center of gravity thereof;

b. a rigid axle articulated at its ends to the lower ends of said steering knuckles to keep said knuckles apart a predetermined distance;

c. a lateral stabilization yoke member formed of a pair of side legs and a bight, the ends of said legs being fixed to said axle;

d. a pair of weight transfer resilient units each connected at one end to one of said members and, at the other end, to said body whereby to transfer the weight of the body to said steering knuckle;

e. a sway motion compensating lever mounted for rotation about an axis extending through the center thereof, and f. leverage means interconnecting said compensating lever to the bight of said yoke member and to said body, so constructed and arranged that swaying motion of said body relative to said bight causes rotation of said compensating lever about said axis whereby to allow said swaying motion.

2. The combination of claim 1, wherein said leverage means comprises;

a pair of upstanding idlers one on either side of said body, each idler being mounted at the lower end on said body for pivotal movement about an axis extending longitudinally of said body;

a transverse motion-transferring bar articulated at its center to the bight of said yoke and at the ends to said idlers;

means mounting said sway-motion compensating lever at the upper end of one of said idlers for rotation about an axis extending vertically through its center;

a connecting rod articulated at one end to one end of said compensating lever;

a link articulated to the free end of said connecting rod and to said body, respectively, and a further link articulated to the other end of said compensating lever and to said body, respectively.

3. The combination of claim 2, wherein said legs of said yoke member are solid with said axle bar and said bight of said yoke is articulated at the ends thereof to the top ends of said legs.

4. The combination of claim 3, wherein said resilient units are connected at said one end to said legs of said yoke members.

5. The combination of claim 1, wherein said body includes an upstanding frame at the forward end thereof; said steering knuckles, axle and suspension members being generally disposed along the four sides of a quadrilateral and form a suspension frame for said body, and wherein said leverage means comprises:

a pair of trailing arms articulated at one end to the top of said upstanding frame on either side thereof and articulated, at the other end, to the top of said suspension frame;

means mounting said rotary lever on the bight of said yoke member for rotation about an axis through its center, and articulated connections interconnecting said trailing arms and the free ends of said rotary lever, so constructed and arranged that swaying of said body in a curve causes rotation of said lever about said axis and axial rotation of said trailing arms through said articulated connections.

6. The combination of claim 5, wherein each of said articulated connection comprises:
a link rigid with and laterally projecting from the corresponding trailing arm adjacent said upstanding frame, and
a connecting rod articulated at one end to the free end of said link and articulated at the other end to one end of said rotary lever.

7. The combination of claim 6, wherein said suspension frame comprises a further upstanding frame transversely of said body generally in line with the axes of said wheels and a yoke retaining arm articulated at the ends to said bight of said yoke and to said further frame, respectively.

8. The combination of claim 7, wherein said suspension members are articulated at the top of said further frame.

9. The combination of claim 1, wherein said resilient units are connected at said one end to said suspension members.

10. The combination of claim 1, wherein said vehicle has a rear suspension comprising: a rear axle, a pair of rear wheels mounted on said axle, supporting struts pivoted at one end to said axle and inclined toward one another; a suspension member, for each strut, pivoted at one end to said body and at the other end to the top of said struts above the center of gravity of said body; and a pair of weight-transfer resilient units connected to said body and to said suspension members, the improvement with said suspension comprising:
an upright post solid with said rear axle;
a sway-motion compensating lever mounted on the top of said post for rotation about an axis extending through the said lever, and
a pair of connecting rods, each articulated to one free end of said lever and to one of said suspension members.

* * * * *